Nov. 14, 1939.   F. K. ZERBE   2,179,774
WELDED PRESSURE VESSEL
Filed Dec. 7, 1935
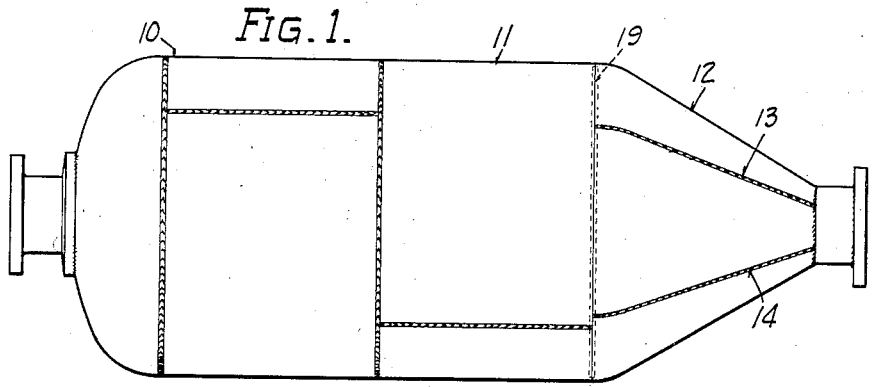
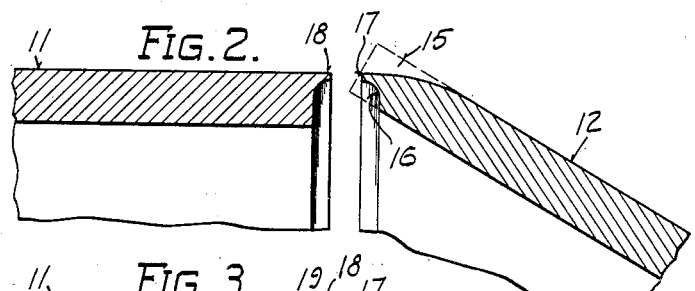
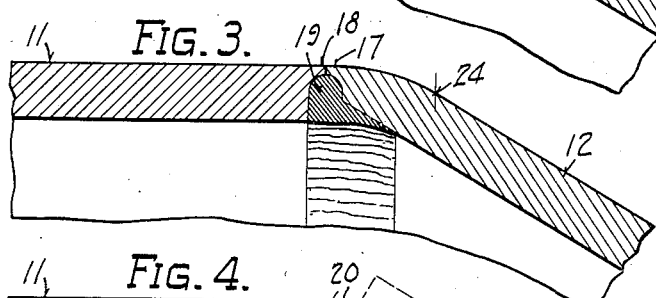
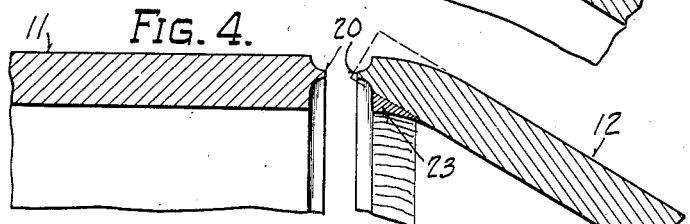
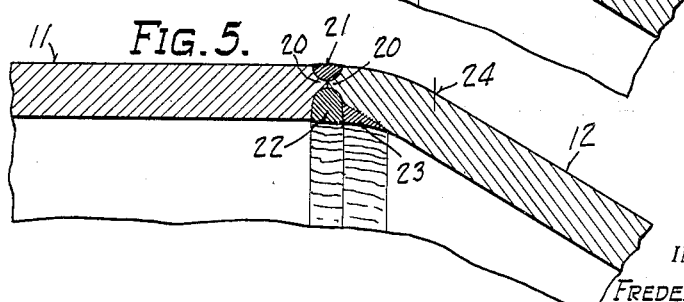
INVENTOR.
FREDERICK K. ZERBE
BY
ATTORNEY.

Patented Nov. 14, 1939

2,179,774

UNITED STATES PATENT OFFICE 2,179,774

WELDED PRESSURE VESSEL

Frederick K. Zerbe, Waukesha, Wis., assignor to A. O. Smith Corporation, Milwaukee, Wis., a corporation of New York Application December 7, 1935, Serial No. 53,295

3 Claims. (Cl. 220—75)

The present invention relates to welded pressure vessels.

More specifically the invention applies to cylindrical pressure vessels having a cone-shaped end or head joined to the cylindrical shell of the vessel by welding.

The invention provides a vessel of the above type having greatly improved physical characteristics and one which is simple and economical in manufacture. It has been the practice in the past frequently to employ metal of substantially greater thickness in the cone than in the vessel shell wall and to place in juxtaposed relation the end of the straight sided cone and the end vessel shell wall and unite the two by fushion deposited weld metal placed in a space therebetween, such weld being located at the position of abrupt change in direction between the cone and shell.

The present invention produces a structure wherein a gradual approach or curvature of the cone toward the shell is provided. It further removes the position of the welded joint a substantial distance from the position of maximum curvature of said approach.

The present invention provides a structure which lends itself readily to efficient and economical fabrication and constitutes a superior vessel when complete.

The invention will be better understood by reference to the accompanying drawing of which:

Figure 1 is an elevational view of a pressure vessel embodying the invention;

Fig. 2 is a fragmentary longitudinal sectional view of a shell and a head suitable for use with the present invention;

Fig. 3 is an enlarged fragmentary sectional view showing the completed joint employing the parts of Fig. 2;

Fig. 4 is a view similar to that of Fig. 2, but modified therefrom; and

Fig. 5 shows a modification of the structure shown in Fig. 3, using the parts illustrated in Fig. 4.

In the drawing, 10 represents a pressure vessel having a cylindrical portion 11 and a conical shaped head section 12.

Conical head 12 is constructed by forming, preferably by pressing, segments of a cone and joining them by welding along lines such as 13 and 14. Cone 12 is then mounted in a lathe or other suitable machine and the metal at 15 removed to form a rounded approach between the conical and cylindrical portions of the vessel. The inner portion 16 may also be removed at the time of machining to partially form a welding groove and, as in Fig. 2, produce a lip 17.

The cylindrical vessel portion 11 may be made up of rings welded together to constitute the cylinder and in Fig. 2 has been shown as having been machined out on the end to form a lip 18 which registers with lip 17 of the cone end and produces a welding groove 19 which is filled with weld metal as shown in Fig. 3 to fuse the cone and cylinder together in the construction of the vessel.

Figs. 4 and 5 illustrate a variation in the formation of the welding grooves in which registering lips 20 are formed on the meeting edges of the cylindrical vessel wall 11 and the conical head 12 to provide outside and inside grooves 21 and 22, respectively. Another modification illustrated in Figs. 3, 4 and 5 is the building up by welding of portion 23 upon head 12 to produce a narrower welding groove and to thereby lessen the stresses set up upon the cooling of the metal employed in groove 22 to unite the cylinder and cone.

It will be seen that by employing the constructions above described the line of greatest curvature of the conical head as it merges into the cylinder is at approximately line 24 and is well removed from the position of the weld joining these two members. This is a desirable condition since the zone of approximate maximum stress between the cylinder and the conical head of the vessel when subjected to internal pressure is located in the parent metal of the head removed from the weld and is not concentrated at the weld where the effect of stresses due to shrinkage and other causes resulting from non-similarity between weld metal and plate exists.

I claim:

1. A cylindrical pressure vessel of substantially uniform wall thickness comprising a cylindrical body portion, a conical head portion having its large end reduced in thickness by a curved outer surface merging with the outer surface of said body portion, and a circumferential weld joining said body and said head in a position removed from the zone of maximum stress at the merger of the conical and cylindrical portions of the vessel.

2. A cylindrical pressure vessel of substantially uniform wall thickness comprising a cylindrical body portion, a conical head portion comprising segmental metal plate sections welded together along their meeting edges, said head having its large end reduced in thickness by a curved outer surface merging with the outer surface of said body portion, and a circumferential weld, of a tensile strength at least equal to that of the body portion, joining said body and said head in a position removed from the zone of maximum stress at the merger of the conical and cylindrical portions of the vessel.

3. A cylindrical pressure vessel comprising a cylindrical body portion, a conical head portion having its large end complementary to the end of said cylindrical body portion, one of said members being reduced in thickness by a curved outer surface merging with the outer surface of the other member, and a circumferential weld joining said body and said head and maintaining the thickness of said members uniform throughout the joint.

FREDERICK K. ZERBE.